US006937784B1

(12) United States Patent
Stevens et al.

(10) Patent No.: US 6,937,784 B1
(45) Date of Patent: Aug. 30, 2005

(54) METHOD AND APPARATUS FOR MEMS OPTICAL SWITCHING USING ROTATING MIRRORS

(75) Inventors: Rick C. Stevens, Apple Valley, MN (US); Kevin J. Thorson, Eagan, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 214 days.

(21) Appl. No.: 10/328,596

(22) Filed: Dec. 23, 2002

(51) Int. Cl.[7] .............................................. G02B 6/26
(52) U.S. Cl. ........................................ 385/18; 385/17
(58) Field of Search .................................... 385/16–18

(56) References Cited

U.S. PATENT DOCUMENTS

| | | | | |
|---|---|---|---|---|
| 6,330,380 B1 * | 12/2001 | Young et al. | .................. | 385/17 |
| 6,477,290 B1 * | 11/2002 | Wan et al. | ..................... | 385/17 |
| 6,542,657 B2 * | 4/2003 | Anderson | .................... | 385/18 |
| 6,757,093 B2 * | 6/2004 | Wood et al. | ................. | 359/291 |
| 2003/0086220 A1 * | 5/2003 | Nelson | ........................ | 361/49 |
| 2004/0013349 A1 * | 1/2004 | Bhattacharya et al. | ........ | 385/18 |

OTHER PUBLICATIONS

Barnes et al., *Torsional Ratcheting Actuating System*, Technical Proceedings of the Third International Conference on Modeling Simulation of Microsystems, San Diego, CA, Mar. 27-29, 2000, pp. 273-276.

* cited by examiner

*Primary Examiner*—Brian Healy
*Assistant Examiner*—Eric Wong

(57) ABSTRACT

An optical switching device uses a first set containing at least one MEMS mirror that receives light from a light source. A second set of MEMS mirrors are arranged to receive light from the mirror(s) of the first set. The mirrors can be independently aimed so any mirror of the first set can direct light to any mirror of the second set. A set of light collectors collects light reflected from the second set of mirrors. A collimating lens may be included between any of the mirrors and the light sources/collectors. The MEMS mirrors may be activated by being flipped down or otherwise disconnect any mirror of the first or second set.

15 Claims, 5 Drawing Sheets

METHOD AND APPARATUS FOR MEMS OPTICAL SWITCHING USING ROTATING MIRRORS

FIELD OF THE INVENTION

The present invention relates in general to fiber optic devices, and in particular fiber optic switching devices.

BACKGROUND

Fiber optic devices are widely used in such fields as data communications. Fiber optic data transmission has numerous advantages, including high bandwidth, insusceptibility to electromagnetic noise, long range using small diameter fibers, etc.

Switching of fiber optic signals has traditionally involved converting the optical signals to electrical signals, switching the electrical signals, and then converting back to optical signals. In general, it is much easier to switch and otherwise control electrons than light waves. However, the conversion of optical data to electrical signals reintroduces some of the problems that optical data was intended to avoid such as electromagnetic emission and interference.

An apparatus and method that address the aforementioned problems, as well as other related problems, are therefore desirable.

SUMMARY

To overcome limitations in the prior art described above, and to overcome other limitations that will become apparent upon reading and understanding the present specification, the present invention discloses a method and apparatus for controlling and switching a plurality of optical signals.

In accordance with one embodiment of the invention, a configurable optical switch for directing light from one or more light sources includes a first set of one or more mirrors arranged to reflect light from the one or more light sources. A second set of mirrors is arranged to reflect light from the first set of mirrors. One or more collectors is arranged to gather light reflected from the second set of mirror. A first set of Micro Electro Mechancial System (MEMS) actuators is arranged to align the one or more mirrors of the first set to reflect light to any mirror of the second set in response to a configuration signal.

The above summary of the present invention is not intended to describe each illustrated embodiment or implementation of the present invention. This is the purpose of the figures and the associated discussion which follows.

BRIEF DESCRIPTION OF THE DRAWINGS

The invention is described in connection with the embodiments illustrated in the following diagrams.

DETAILED DESCRIPTION

In the following description of various example embodiments, reference is made to the accompanying drawings which form a part hereof, and in which is shown by way of illustration various manners in which the invention may be practiced. It is to be understood that other embodiments may be utilized, as structural and operational changes may be made without departing from the scope of the present invention.

Generally, the present invention provides a method and apparatus for switching light from a plurality of light sources to a plurality of light collectors using mirrors formed using Micro-Electro-Mechanical Systems (MEMS) manufacturing processes. MEMS devices are micron-scale mechanical devices formed by processing silicon in a manner similar to the layering used to form semiconductor devices such as microprocessors. In the MEMS process, a mask is deposited and then silicon material etched away in a process known as micromachining.

Figure 1:
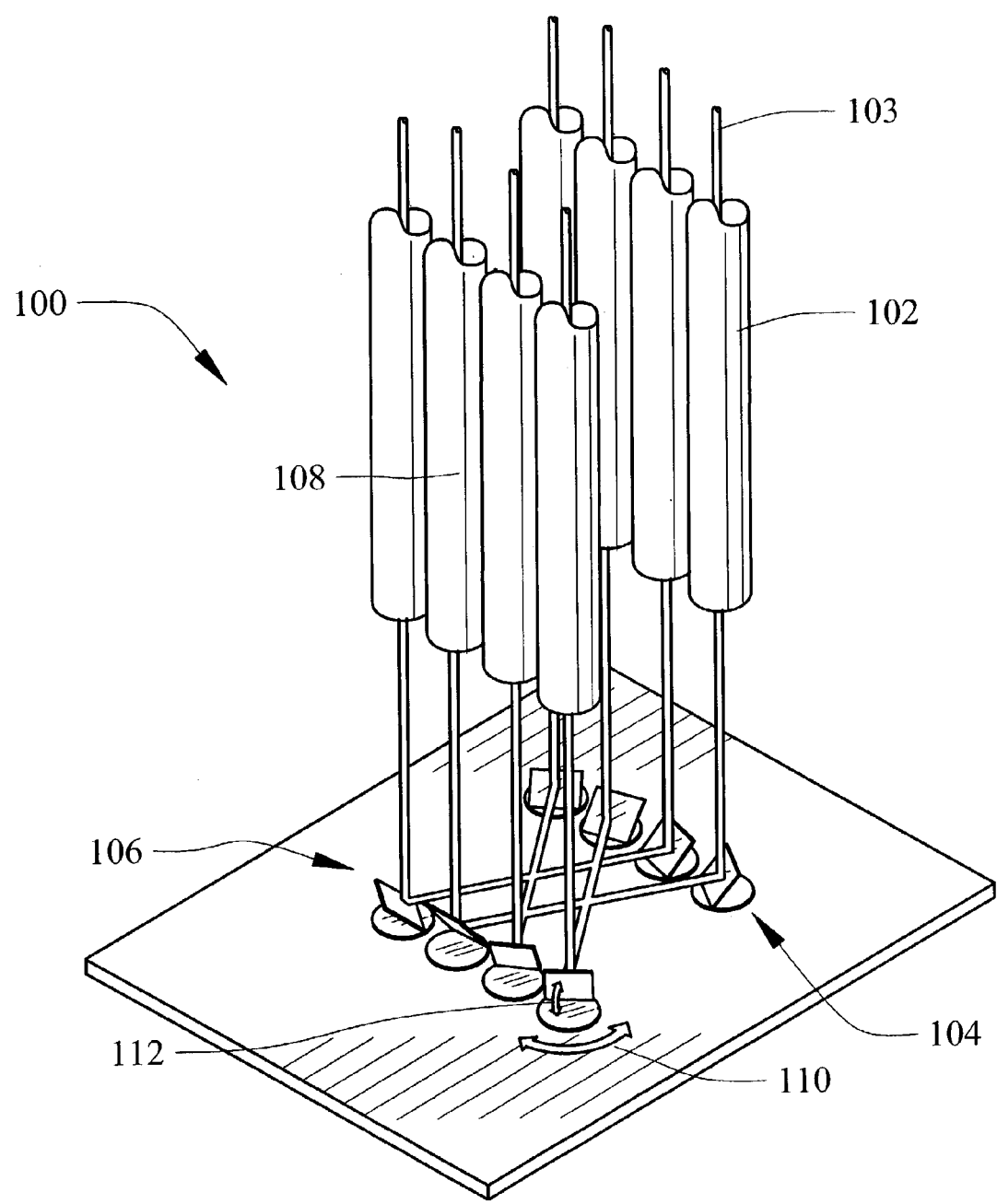
FIG. 1 is a perspective view of an optical switching assembly according to an embodiment of the present invention.

FIG. 1 shows an optical switching assembly 100 according to one embodiment of the present invention. A series of light transmitters 102 (fibers, waveguides, etc) are arranged to direct light onto a first set of mirrors 104. In this example, four transmitters 102 are used to direct four beams of light 103 to a set of four mirrors 104. It is appreciated that any number of light transmitters 102 and mirrors can be used. The mirrors 104 are arranged to direct light to a second set of mirrors 106. The second set of mirrors 106 can contain any number of mirrors, although a quantity of mirrors equal in number to the first set 104 is typically used. One or more light collectors 108 are arranged to receive light reflecting from the second set of mirrors 106.

The mirrors of the first and second sets 104, 106 are configured to selectably rotate about a vertical axis as indicated by the horizontal curved arrow 10 in FIG. 1. It is appreciated that references to vertical and horizontal orientations with respect to FIG. 1 are only for purposes of illustration. In practice, the optical switching assembly may be placed in any arbitrary orientation.

In some applications, it may be desirable to configure one set of mirrors to be fixed. For example, if there was only one rotatable mirror of the first set 104, the second set of mirrors 106 could each be set to a fixed orientation, each aimed at the mirror of the first set 104. More typically, though, the mirrors of both sets 104, 106 are each arranged to independently rotate.

Providing independently rotatable mirrors of the first and second set 104, 106 allows any mirror of the first set 104 to be aimed at any mirror of the second set 106. There may be some practical geometric limitation on the number of mirrors that can be arranged in rows as shown in FIG. 1. In practice, the mirrors of the first and second set 104, 106 may partially block the view between mirrors located at opposite ends of the rows. The factors that may contribute to such view blockages include the amount of separation between rows and the geometry of the mirrors. Regardless, there may be other mirror arrangements that can provide a design using as many mirrors as practical given allowable die sizes for MEMS fabrication.

The mirrors 104, 106 may also be independently flipped up or down as indicated by the curved arrow 112 in FIG. 1. Flipping a mirror to a substantially horizontal orientation prevents the mirror from reflecting light from the other mirrors, effectively taking the mirror out of the circuit. Other methods may be used to orient a mirror to prevent reflection from the other mirrors to accomplish a similar result. For example, the mirror could be rotated or translated to take the mirror out of the view of the other mirrors and possibly out of view of the light sources and collectors 102, 108.

The optical switching assembly 100 is suitable for various applications. Typically, the switching assembly 100 is used in the switching and routing of optical data signals. The switching assembly 100 can be used over any range of wavelengths and used with single mode or multi-mode optical systems. In particular, the switching assembly 100 will typically be designed for a wavelength of 850 nm in data communications applications, and will typically be designed for wavelengths of 1300 m and 1550 nm in telecom applications.

Figure 2:
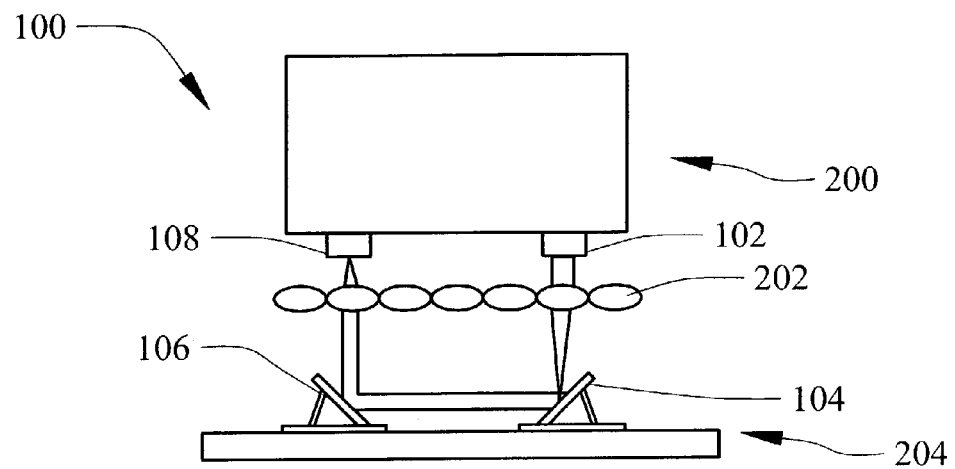
FIG. 2 is a side view of the optical switching assembly according to an embodiment of the present invention.

Turning now to FIG. 2, a side view of the switching assembly 100 is shown. In general, the light sources/collectors 102, 108 are housed in a light assembly 200 to maintain alignment between the light carrying waveguides or fibers that may be part of the light sources/collectors 102, 108. A collimating lens 202 can be located between the light sources/collectors 102, 108 and the mirrors 104, 106. The collimating lens 102 can either be a single optical piece or an arrangement of multiple lenses (e.g. a lenslet array).

The mirrors 104, 106 are generally formed as part of a switching assembly 204 on a MEMS substrate. In one embodiment, the switching assembly 204 includes a hermetically sealed container (not shown) that can be made removable from the light assembly 200. The collimating lens 202 can be made as a separate piece or integrated with either the lighting or switching assembly 200, 204.

Figure 3:
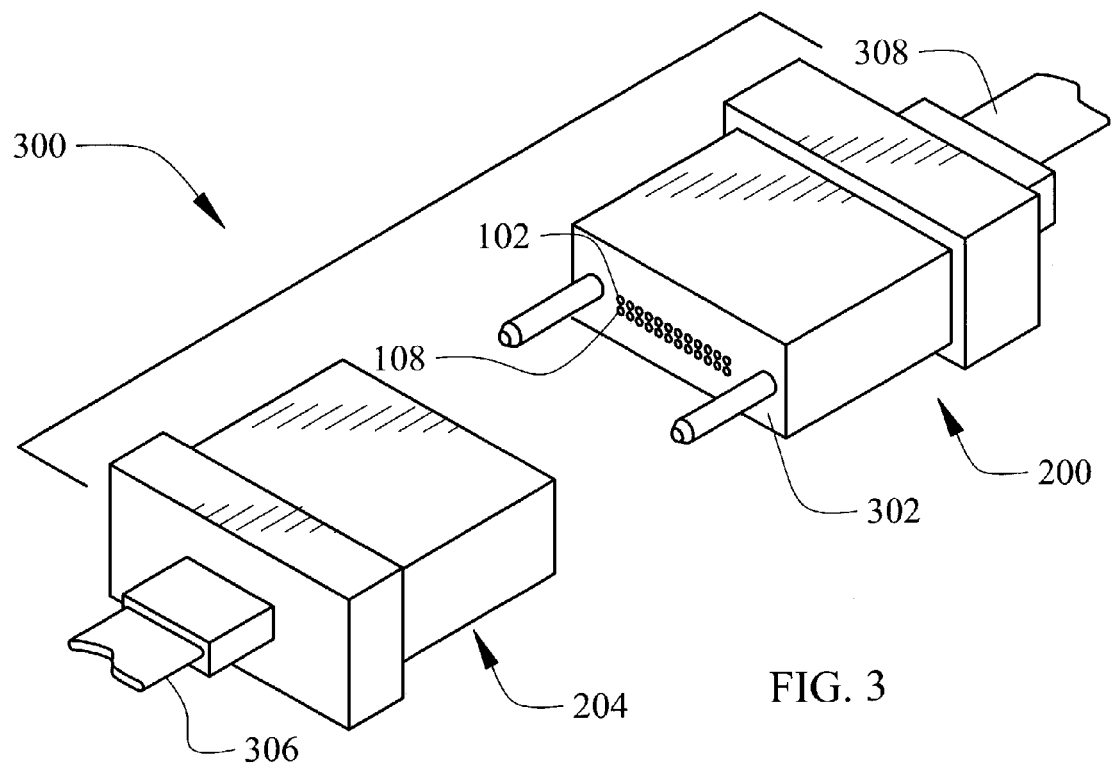
FIG. 3 is a perspective view of an optical switching housing assembly according to an embodiment of the present invention.

FIG. 3 shows a packaging arrangement 300 for an optical switching device in accordance with an embodiment of the present invention. A fiber cable 308 provides the optical signals entering and leaving the lighting assembly 200. The light sources/collectors 102, 108 are enclosed at least in part in the light assembly 200, and terminate at an outer surface 302 of the light assembly 200. The lighting assembly 200 may also contain the collimating lens assembly 202 (not shown in this view).

The lighting assembly 200 and the switching assembly 204 in the arrangement of FIG. 3 include a standard MT-RJ interface for mating with each other. In this example a standard MT-RJ interface is used, however this approach would be applicable to other connector types. The switching assembly 204 mates with the light assembly 200 so that the mirrors 104, 106 are placed in alignment with the light sources and collectors 102, 108. An electrical cable 306 is attached to the switching assembly 204 and provides control signals to the mirrors 104, 106 and other devices in the switching assembly 204.

Figure 4:
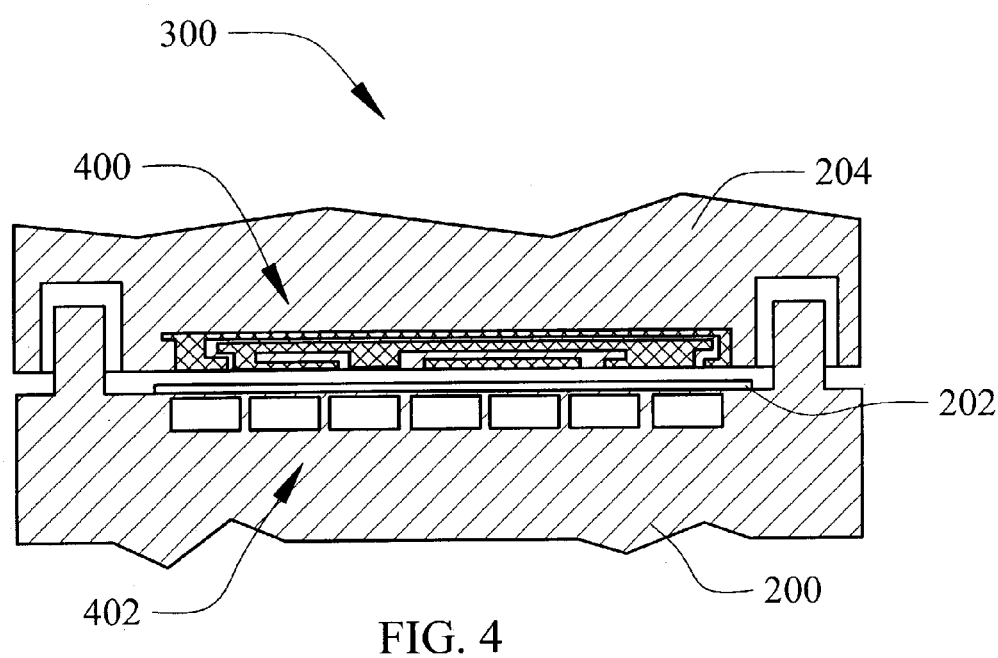
FIG. 4 shows a cross sectional cutaway of an optical switching housing assembly according to an embodiment of the present invention.

FIG. 4 shows a cross sectional cutaway of the assembled packaging arrangement 300 of FIG. 3. The MEMS substrate 400 in the switching assembly 204 includes mirrors 104, 106 as well as actuators and activation members (not shown) for rotating and flipping the mirrors 104, 106. The light assembly 200 may include terminating ends of fiber optic cables as seen in FIG. 3, or may include a high-density interconnect (HDI) optical components 402 (e.g. diode lasers, photoelectric sensors, etc.) as shown in FIG. 4.

Figure 5:
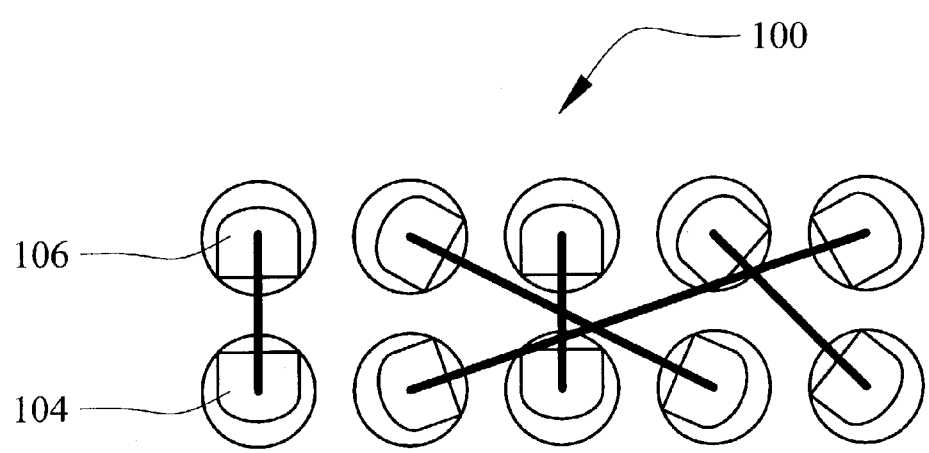
FIG. 5 is a top view of an arrangement of mirrors of an optical switching assembly according to an embodiment of the present invention.

FIG. 5 shows one arrangement of mirrors 104, 106 as seen from a top view of the MEMS switching device 100. Although a distinction is made between first and second sets of mirrors 104, 106, it is appreciated that the mirrors of both sets 104, 106 can be made substantially identical. Defining the first set of mirrors 106 as receiving light from a transmitter 102 and the second set of mirrors as sending light to a collector 108 is for purposes of illustration and not of limitation. In systems using a collimating lens 202, however, the functions of the mirror sets 104, 106 may be fixed to be either receiving or transmitting relative to the sources/collectors 102, 108 due to the one-way nature of the collimating lens 202.

In FIG. 5, the sets of mirrors 104, 106 are arranged in a rectangular pattern. In some applications, this pattern is useful at a 250-micron spacing between mirrors of each set 104, 106. A 250-micron spacing corresponds to the fiber spacing in an MT-RJ connector, therefore allowing the switching device 100 to be compatible with industry standard connectors and hardware. In an MT-RJ compatible configuration, the fibers and collimating lens diameters range from 125 to 250 microns.

Figure 6:
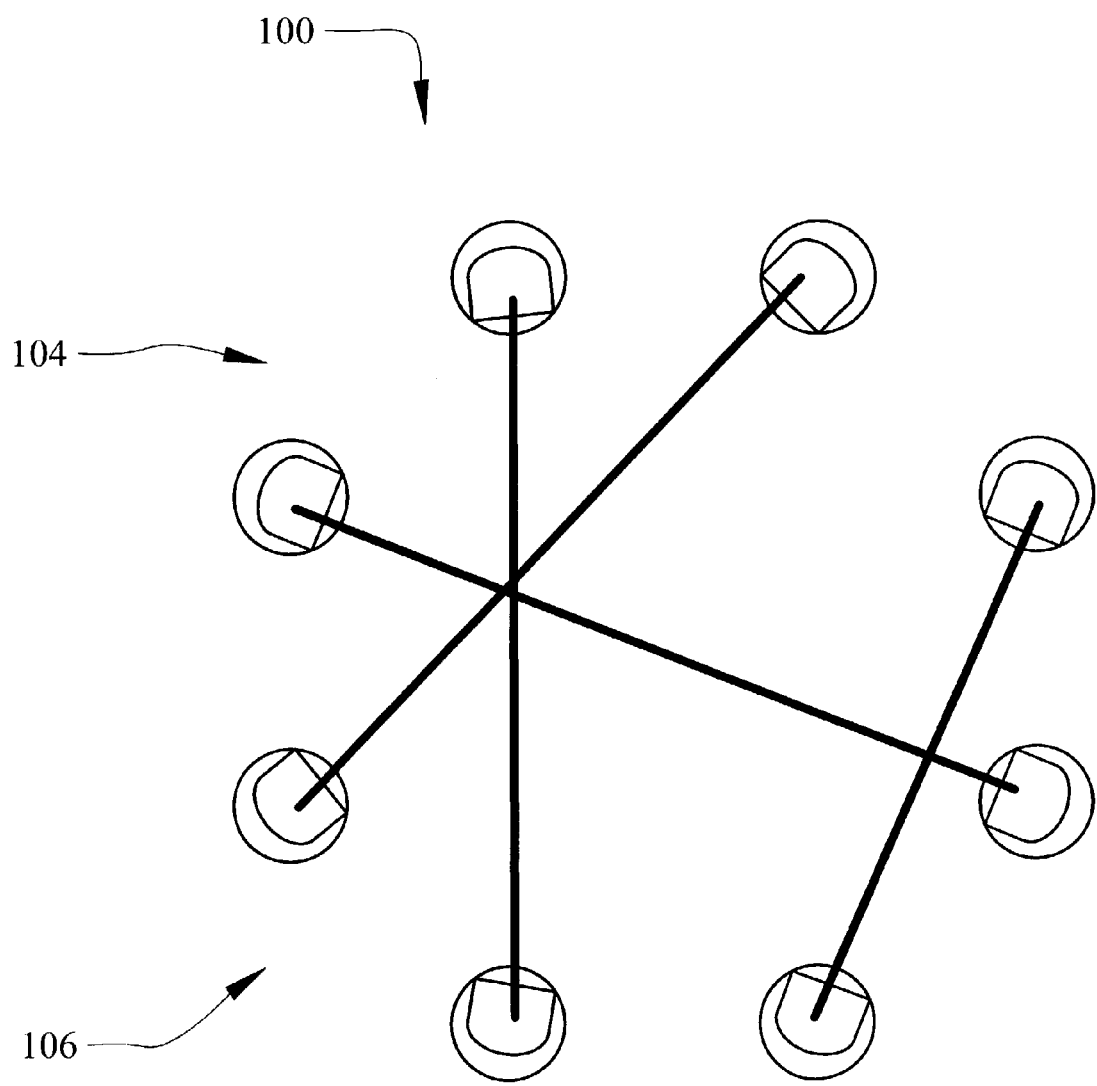
FIG. 6 is a top view of a circular arrangement of mirrors of an optical switching assembly according to another embodiment of the present invention.

FIG. 6 shows a alternate pattern of mirror 104, 106 for a switching device 100. The set of mirrors 104, 106 in FIG. 6 are arranged in a circular pattern. The circular pattern is not as easily packaged in standard housings as the rectangular arrangement of FIG. 5, but may be useful in some applications having large numbers of mirrors 104, 106. It is appreciated that other arrangements of the mirror sets 104, 106 are possible, including triangular, ovular, parabolic curves, matrix, etc.

Figure 7:
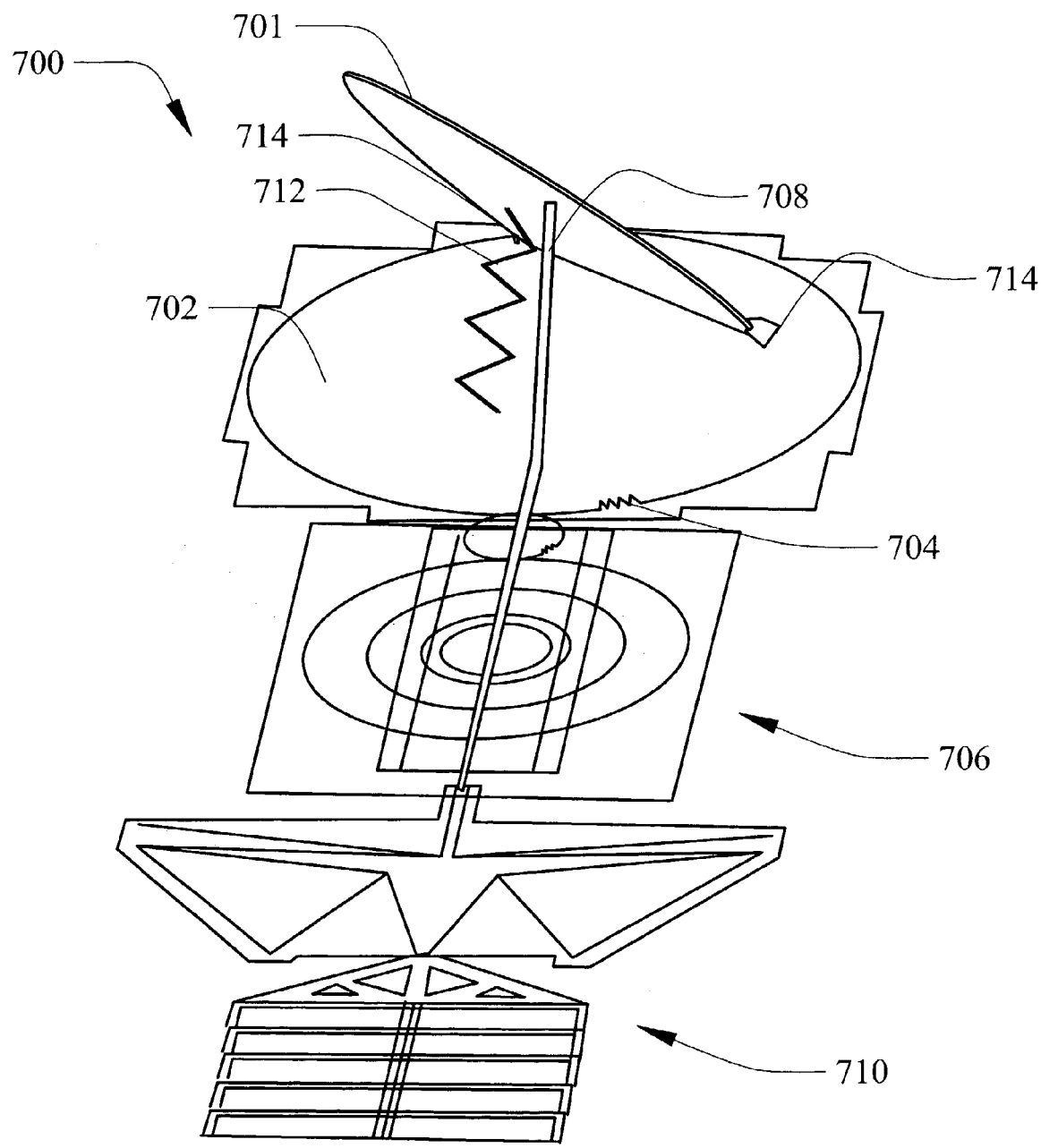
FIG. 7 is a perspective view of a MEMS mirror and actuator assembly according to an embodiment of the present invention.

FIG. 7 shows one example of a mirror assembly 700 according to concepts the present invention. It is appreciated that each mirror of the first and second sets 104, 106 can be made of substantially identical mirror assemblies 700. The mirror assembly 700 includes a reflector 701 attached to circular rotating base 702. The reflector 701 can be flipped up or lie substantially flat on the rotating base 702. The rotating base has gear teeth 704 around the circular perimeter. The gear teeth 704 mesh with gears of a rotational actuator assembly 706.

The rotational actuator assembly 706 selectably rotates the mirror assembly 700 for aiming the reflector 701. The rotational actuator assembly 706 may include any sort of MEMS rotational motor such as a torsional ratcheting actuator, a wedge motor, or an index drive. A description of these devices can be found in the publication "Torsional Ratcheting Actuating System", Stephen M. Barnes, et al, Technical Proceedings of the Third International Conference on Modeling and Simulation of Microsystems, San Diego, Calif., Mar. 27–29, 2000, pp. 273–276. Another motor design is described in the paper "Micromachine Wedge Stepping Motor", James J. Allen, et al, Presented at the 1998 ASME International Mechanical Engineering Congress and Exposition, Anaheim, Calif., Nov. 15–20, 1998.

A comb drive motor 710 can be used to provide a linear motion to push a rod assembly 708, which is used to flip the reflector 701 up and down. Alternatively, the reflectors 701 may be popped by stress beams 712. The stress beams 712 take their actuated shape automatically after manufacture. The mirror assembly 700 may include latches 714 to hold the reflector in an upright orientation for fixed-type mirror assemblies.

It will, of course, be understood that various modifications and additions can be made to the preferred embodiments discussed hereinabove without departing from the scope of the present invention. Accordingly, the scope of the present invention should not be limited by the particular embodiments described above, but should be defined only by the claims set forth below and equivalents thereof.

What is claimed is:

1. A configurable optical switch for directing light from one or more light sources, comprising:
   a first set of one or more mirrors arranged to reflect light from the one or more light sources;
   a second set of mirrors arranged to reflect light from the first set of mirrors;
   one or more collectors arranged to gather light reflected from the second set of mirrors;
   a first set of MEMS actuators arranged to align the one or more mirrors of the first set to reflect light to any mirror of the second set in response to a configuration signal;
   a switch housing containing the first and second sets of mirrors and the first set of MEMS actuators; and
   a light housing removably attachable to the switch housing and containing at least part of each of the light sources and at least part of each of the collectors.

2. The optical switch of claim 1, further comprising a first set of MEMS activation members arranged to position the mirrors of the first set in an orientation where the respective mirror does not reflect light to any mirror of the second set.

3. The optical switch of claim 1, further comprising a second set of MEMS actuators arranged to align the mirrors of the second set to reflect light from any mirror of the first set.

4. The optical switch of claim 1, further comprising a second set of MEMS activation members arranged to position one or more mirrors of the second set in an orientation where the one or more mirrors of the second set do not reflect light from any mirror of the first set.

5. The optical switch of claim 1, wherein the light housing contains a high density interconnect substrate.

6. The optical switch of claim 1, further comprising a collimating lens between the light sources and the first set of mirrors.

7. The optical switch of claim 1, further comprising a collimating lens between the light collectors and the second set of mirrors.

8. The optical switch of claim 1, wherein the mirrors of the first set and second sets comprise MEMS mirrors.

9. A configurable optic switch, comprising:
   a plurality of light transmission means;
   a first reflection means to reflect light from the plurality of light transmission means;
   a second reflection means to reflect light from the first reflection means;
   a plurality of light collection means to collect light from second reflection means;
   a first MEMS actuation means selectably displacing the first reflection means to selectably route light from any of the light transmission means to any of the light collection means;
   a switch housing containing the first and second reflection means and the first MEMS actuation means; and
   a light housing removably attachable to the switch housing and containing at least part of the light transmission means and at least part of the light collection means.

10. The optic switch of claim 9, further comprising MEMS activation means coupled to the first reflection means to selectably move the first reflection means to an orientation where light from at least one of the plurality of light transmission means does not reflect to the second reflection means.

11. The optic switch of claim 9, further comprising a second MEMS actuation means to displace the second reflection means to selectably route light from any of the light transmission means to any of the light collection means.

12. The optic switch of claim 9, further comprising MEMS activation means coupled to the second reflection means to selectably move the second reflection means to an orientation where light from the plurality of light transmission means cannot reflect to the second reflection means.

13. The optic switch of claim 9, further comprising:
   switch housing means for containing the first and second reflection means and the first actuation means; and
   a connector housing means for containing at least a part of the light collection means and at least a part of each of the light transmission means, the connector housing means removably attachable to the switch housing means.

14. The optic switch of claim 9, further comprising a collimating means to focus light from the plurality of light transmission means on the first reflection means.

15. The optic switch of claim 9, further comprising a collimating means to focus light from the second reflection means on the plurality of light collection means.

* * * * *